United States Patent [19]
Adler

[11] 4,456,265
[45] Jun. 26, 1984

[54] GLIDING RING

[76] Inventor: Alan J. Adler, 752 La Para Ave., Palo Alto, Calif. 94302

[21] Appl. No.: 3,992

[22] Filed: Jan. 16, 1979

[51] Int. Cl.³ .............................................. A63B 65/10
[52] U.S. Cl. .................................. 273/425; 244/45 R; 244/34 A
[58] Field of Search ............... 273/106 B, 106 D, 424, 273/425; 244/45 R, 34 A

[56] References Cited

U.S. PATENT DOCUMENTS

| | | |
|---|---|---|
| D. 241,565 | 9/1976 | Molenaar . |
| 708,519 | 9/1902 | Bradshaw .................. 273/106 B |
| 1,508,604 | 9/1924 | Leathers .................. 244/45 R X |
| 1,556,560 | 10/1925 | MacMechen et al. ............. 244/45 R |
| 1,683,643 | 9/1928 | Wittmaak .................. 273/106 B |
| 1,986,937 | 1/1935 | MacGregor .................. 273/106 B |
| 1,991,689 | 2/1935 | McClintock .................. 273/106 B |
| 2,126,245 | 8/1938 | Darby . |
| 2,324,022 | 7/1943 | Prause, Jr. .................. 273/106 D |
| 2,640,699 | 6/1953 | Garbo .................. 273/106 B X |
| 3,029,077 | 4/1962 | Benkoe . |
| 3,082,572 | 3/1963 | Knox, Jr. . |
| 3,220,142 | 11/1965 | Butterfield . |
| 3,312,472 | 4/1967 | Kerr . |
| 3,359,678 | 12/1967 | Headrick . |
| 3,545,760 | 1/1968 | Wilson . |
| 3,565,434 | 2/1971 | Liston .................. 273/106 D |
| 3,566,532 | 3/1971 | Wilson . |
| 3,580,580 | 5/1971 | Wark . |
| 3,594,945 | 7/1971 | Turney . |
| 3,673,731 | 7/1972 | Farhi et al. . |
| 3,673,732 | 7/1972 | Liotta . |
| 3,724,122 | 4/1973 | Gillespie . |
| 3,742,643 | 7/1973 | Keith . |
| 3,765,122 | 10/1973 | English . |
| 3,828,466 | 8/1974 | Geiger . |
| 3,838,835 | 10/1974 | Kling . |
| 3,939,602 | 2/1976 | Burke et al. . |
| 4,023,805 | 5/1977 | Sherrill .................. 273/106 B |
| 4,104,822 | 8/1978 | Rodgers . |
| 4,114,885 | 9/1978 | Morrow .................. 273/106 B |

OTHER PUBLICATIONS

English v. North Pacific Products, Inc. 1976.
English v North Pacific Products, Inc. 1977.
"Analysis and Comparison of Flying Ring Toys" Dr. Robert E. Wilson, 12-1975.
"Frisbee G-70 Flying Ring" Backing Board & Photograph.

Primary Examiner—Paul E. Shapiro
Attorney, Agent, or Firm—Limbach, Limbach & Sutton

[57] ABSTRACT

A gliding ring toy comprised of an annular airfoil angled in order to compensate for air downwash effects and to balance the aerodynamic lift, fore and aft, in gliding flight.

23 Claims, 7 Drawing Figures

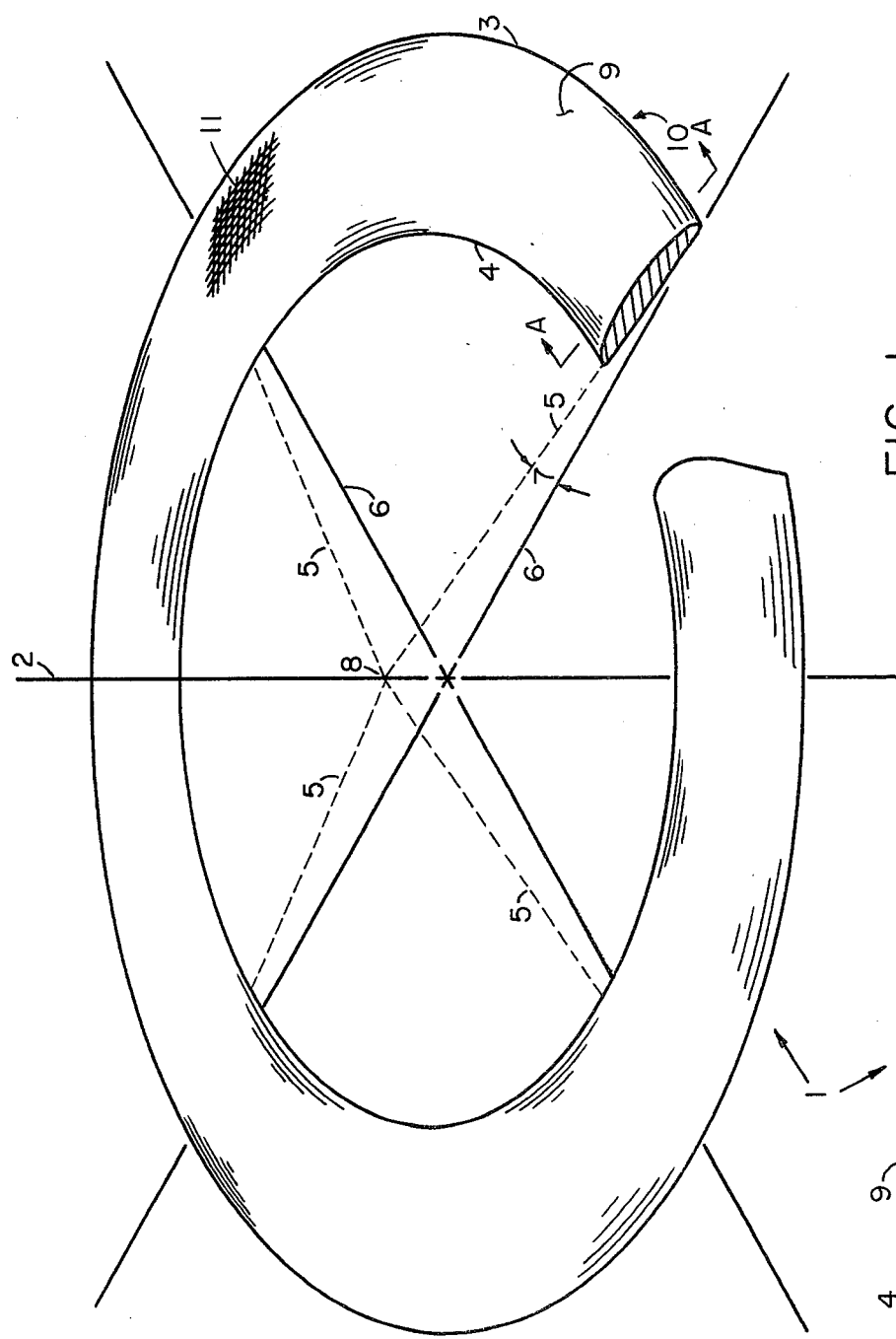
FIG. I.
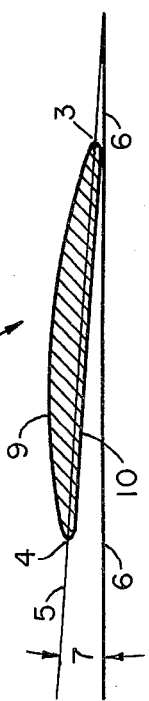
FIG. I-A.

GLIDING RING

BACKGROUND OF THE INVENTION

1. Field of the Invention:

This invention relates to amusement devices or toys, and, more specifically, aerial flying discs and ring devices.

2. Prior Art:

There have been numerous prior aerial flying discs and rings. Some of these are listed below:

U.S. Pat. No. 3,359,678—Headrick
U.S. Pat. No. 3,724,122—Gillespie

These patents deal with flying discs.

U.S. Pat. No. 2,126,245—Darby
U.S. Pat. No. 3,828,466—Geiger
U.S. Pat. No. 3,939,602—Burke & Meyers
U.S. Pat. No. De. D241,565—Molenaar These patents deal with flying discs which include one or more perforations in their surface.

U.S. Pat. No. 708,519—Bradshaw
U.S. Pat. No. 3,580,580—Wark & Schladermundt
U.S. Pat. No. 3,765,122—English These patents deal with flying rings.

A common feature of the patents listed above is that they all include one or more circular rims, flanges, or lips which are oriented generally perpendicular to the initial path of flight. For example, the Bradshaw patent shows a lip, perpendicular to the plane of the ring, at the inner perimeter of the ring, while the English patent shows a very similar lip on the outer perimenter of the ring. The Wark patent shows lips on both the inner and outer perimeters and although these lips are not perpendicular to the plane, they are very nearly so and thus have a similar aerodynamic effect. These lips serve to stabilize the flight by capturing air below the device in a manner analogous to a parachute. However, they contribute a substantial increase in aerodynamic drag which greatly limits the range and duration of flight.

It is clear from reading the disclosures of the Bradshaw, Wark and English patents that they all attempted to dispense with these lips, but were unable to achieve stable flight without them. Bradshaw states at column 2, lines 59–62, that his central opening maintains the quoit in an upright position, which result cannot be secured with so light a quoit when the flange is omitted.

Wark states at column 2, lines 4–6, that he utilizes an outer flange and an inner flange, both of which contribute to the lift of the aerial disc, as well as its stability in flight. He provides ribs or beads at the lower edges of these flanges. At column 2, lines 18–20, he maintains that these ribs or beads have a stabilizing effect during the flight and the outer rib, particularly, does have the ability to hold the rear section at its chosen flight angle of attack. He states further in the same column, lines 24–25, that it has been found that if the outer annular rib is omitted the rear edge of the spinning device tends to rise.

English states at column 2, lines 62–68, that if his circular shaped deflector surface 21 that slopes downwardly and inwardly towards the central opening was merely flat and coplanar with his outer ring portion 19 then the vast majority of the mass of air of the air sheet would slip over the top of the toy and not be able to boost up the toy trailing edge. As a result, the toy leading edge would soon tilt upwardly and its flight would become stalled. At column 3, lines 29–33 he states that the width-to-height ratio may vary within an optimum performance range from 1:1/16 ($W:h_1$) and 1:⅛($W:h_2$). If the ratio is beyond this range to one side (e.g. 1:1/17) then the toy will tend to stall in flight and topple. In this latter statement English is referring to the ratio of the radial width of the ring to the axial height of the rim, and if this ratio is too great—meaning that the rim is too small—an unstable flight will result.

Rodgers, U.S. Pat. No. 4,104,822, designed a flying ring which has no lip per se, however, it employs a blunt, thick cross-section which has drag properties somewhat similar to a lip. However, Rodgers does state that the lift characteristics of his device must be limited in order to limit the possibility of it rolling (banking) to one side and falling to the ground.

Two other prior patents are also noted:

U.S. Pat. No. 1,986,937—MacGregor
U.S. Pat. No. 1,991,689—McClintock

These two patents relate to heavy steel quoits which are intended to be pitched, like horseshoes, at a stake projecting from the ground. Despite their relatively streamlined appearance, they cannot be classed as aerial toys (gliding bodies). This is because their ratio of weight to lifting area is so high that their calculated minimum speed to sustain a gliding level flight is in excess of 150 feet per second (112 MPH). This is more than three times the velocity of 38 FPS which is attained by aerial flying-saucer toys in normal use.

The present inventor sought to develop a new type of circular aerial toy which was capable of exceptionally longrange level flights. This necessitated a thin, streamlined, low drag airfoil free of excess thickness, lips, flanges or rims and in a configuration which balanced the aerodynamic lift at the center of gravity in order to achieve a straight flight—something which had eluded all known previous inventors of circular aerial toys.

SUMMARY OF THE INVENTION

The present invention consists of a thin, lightweight, streamlined ring which can be thrown with a spinning action and caught in a manner similar to other circular aerial toys, but is capable of dramatically longer flights than these prior devices. A unique feature of the present invention is the small airfoil-angle. This balances the center of lift at the center of gravity and provides for a straight, stable flight without resorting to the high drag configurations of all known prior devices in this category.

BRIEF DESCRIPTION OF THE DRAWINGS

FIG. 1 is a cutaway isometric view of the preferred embodiment of the present invention.

FIG. 1A is an elevational sectional view of a portion of the structure shown in FIG. 1 taken along line A—A in the direction of the arrows.

DETAILED DESCRIPTION OF THE INVENTION

Figure 2:
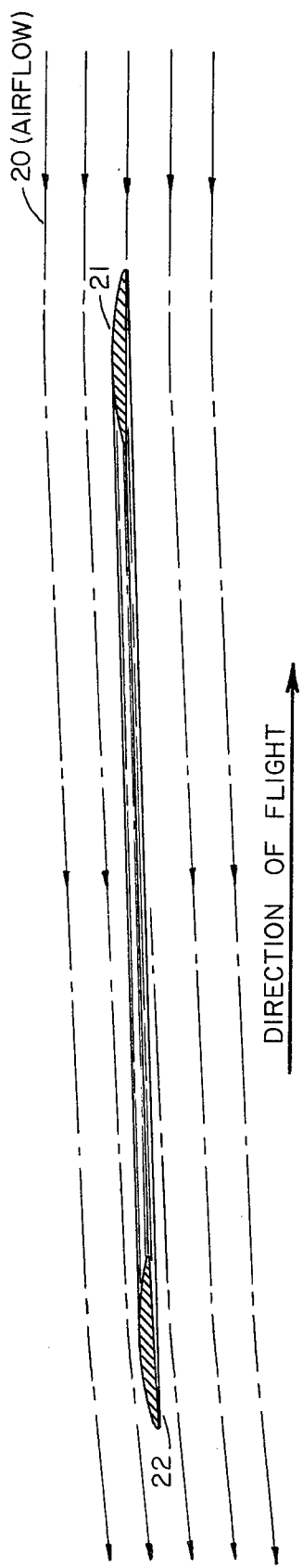
FIG. 2 is a cross-section of the preferred embodiment which illustrates the path of the airflow during flight.

FIG. 1 is a cutaway isometric view of the preferred embodiment of the invention. It consists of a thin annular airfoil 1, symmetrical around an axis of revolution 2, and having a projected plane which is depicted by lines 6. The projected plane 6 is, of course, perpendicular to the axis of revolution 2. The airfoil has an upper surface 9 and a lower surface 10. The leading and trailing edges of the airfoil are defined by the outer perimeter 3 and the inner perimeter 4. Extended chord lines 5 pass through these perimeters and describe the airfoil-angle 7, which is measred relative to the projected plane 6 of the annulus. In the present invention this airfoil-angle 7 is always negative, that is the outer perimeter 3 is lower than the inner perimeter 4 when the projected plane 6 of the annulus is horizontal and the body is oriented for proper flight, with its upper surface uppermost.

When the extended chord lines 5 are extended radially inwards to their point of intersection 8 on axis 2, they form the upper conical surface of an imaginary right circular cone. Revolution of the chord length of extended chord line 5 about axis 2 defines the angled surface of a frustum of a cone. In FIGS. 1 and 1A, airfoil-angle 7 is exaggerated for the sake of clarity. It is noted in FIG. 1A that the extended chord line 5 passing through the outer and inner perimeters 3 and 4 lies above the lower surface which in the illustrated embodiment is straight.

The present inventor first experimented with a thin ring which was flat. In other words, angle 7 was zero. When thrown with a right-handed backhand throw, so that the ring was spinning clockwise when viewed from above, this flat ring would always bank to the left and fall to the ground. When thrown by a forehand throw, with counterclockwise rotation, the ring banked to the right and again fell to the ground.

The flat ring was constructed of a soft thin aluminum sheet permitting experiments with a variety of bends and deformations of the ring in an effort to achieve a straight level flight. It was discovered that when the ring was formed in a slightly conical configuration, with the correct airfoil-angle 7, a beautiful straight and level flight was achieved. Furthermore, because of the thin, low drag form of the ring, great distances were achieved with very little effort. A genuine breakthrough in flight performance had been achieved. Here was a ring which achieved stable flight without the high-drag rims or flanges of previous rings (such as the rings of the Bradshaw, Wark and English patents).

These experiments also revealed that if the airfoil-angle 7 was too slight the ring would always bank to the left (for a level throw with the previously described clockwise rotation) and if the airfoil-angle 7 was too great, the ring would bank to the right.

Subsequently, the inventor embarked on a series of experiments with plastic rings to determine the optimum airfoil-angle 7 and also the optimum airfoil section. Purely analytical studies of low Reynold's number drag were also employed to select the best inside and outside diameters. The plastic rings were machined on a lathe and then vacuum formed under heat to establish the airfoil-angle.

The experiments with the plastic rings covered airfoil-angles of from zero to three degrees and a variety of airfoil sections and chambers. Eventually an ogival section with a circular arc top and a straight bottom, was selected for minimum drag. With this section, the optimum airfoil-angle 7, for straight level flight, was found to be 1.5 degrees for a 3.4 ounce ring of 11.75 inches outside diameter and 1.75 inches chord length.

Subsequent to these discoveries the following analytical basis for the airfoil-angle was developed by the inventor.

It is believed that the unique function of the airfoil-angle 7 is to balance lift between the forward and aft areas of the ring in order to achieve superimposition of the center of lift and the center of gravity and thus achieve straight flight.

Referring to FIG. 2, which is a cross-section of the invention, note the flow of air depicted by streamlines 20. (In typical level flight, the entire annular plane is oriented at an angle of attack of approximately two degrees to the flight path or airflow.) Note that the airflow first flows around the forward portion 21 of the airfoil and is deflected downwards by this forward airfoil prior to reaching the aft portion 22 of the annular airfoil. This downward deflection of the airflow is called "downwash" by aerodynamicists and is a factor in the wing and tail interaction of conventional airplanes. Downwash is directly proportional to the lift coeffecient of the forward airfoil. Although the angle of this downwash is also dependent on the exact position behind the forward airfoil, aircraft designers generally employ the following formula when calculating downwash:

$$\theta \simeq \frac{36 \cdot C_L}{A} \tag{1}$$

where
$\theta$ = downwash angle (degrees)
$C_L$ = lift coefficient
$A$ = the aspect ratio of the airfoil = span/chord Lift coefficient may be calculated from a flight test as:

$$C_L = \frac{840 \cdot W}{V^2 \cdot S_e} \tag{2}$$

where
W = weight of the flying body (lbs.)
V = velocity (feet-per-second)
$S_e$ = effective lifting area of the airfoil (square feet)

In flight, the effective listing area ($S_e$) of the annular airfoil is that portion of the annulus which is projected normal to the flight path. (The sides of the annulus, parallel to the flight path contribute very little lift.) This effective lifting area can be approximated as the mean annulus diameter times the sum of the fore and aft chord lengths:

$$S_e \simeq \frac{OD + ID}{2} \cdot 2C$$
$$\simeq (OD + ID) \cdot C$$

or $$S_e \simeq D \cdot 2C$$

where
D = mean diameter
C = chord length

Flight tests on a typical ring showed a velocity of 38 FPS and yielded a calculated $C_L$ of 0.5. This same ring has an apsect ratio (A) of 6. Solving equation (1) gives a downwash angle of three degrees. Thus, the airflow over the aft airfoil area 22 is at a three-degree lower angle than the airflow over the forward airfoil area 21.

Clearly, a flat ring (angle 7=zero) would develop less lift on the aft portion of the airfoil due to downwash effects. This would cause a pitch-up moment which gyroscopic precession would convert to a left-bank (roll), in the case of clockwise rotation.

However, if the ring is formed on a conical plane, as shown in FIGS. 1 and 2, the downwash effect can be fully compensated. For example, if the airfoil-angle 7 is 1.5 degrees the difference in the angle of attack of the forward and aft airfoil areas is twice the amount of angle 7, or three degrees, which exactly equals the downwash angle. Thus, the forward and aft airfoil areas each meet the airflow at the same angle of attack and have equal (and balanced) lift which provides a straight flight.

It is possible to condense and simplify equations (1) and (2) into a generalized design equation for determining the optimum airfoil-angle:

$$\alpha \approx K \frac{W}{V^2 D^2} \quad (3)$$

where
  $\alpha$ = airfoil-angle 7
  K = a constant
  V = intended flight velocity
  D = mean diameter of annulus = (OD+ID/2)
using measure of
  W in ounces
  V in feet per second
  D in inches
then
  $K \approx 64{,}000$ Experience has shown that a flight velocity range of 33 to 47 FPS is common.

In this velocity range the range of airfoil angle can be summarized as:

$$\alpha = \frac{K \cdot W}{D^2} \quad (4)$$

where
  $K = 45 \pm 15$
For example, if W=3.4 ounces and D=10", $\alpha_a = 1.5° \pm 0.5°$ for the above range of flight velocity.

Figure 5:
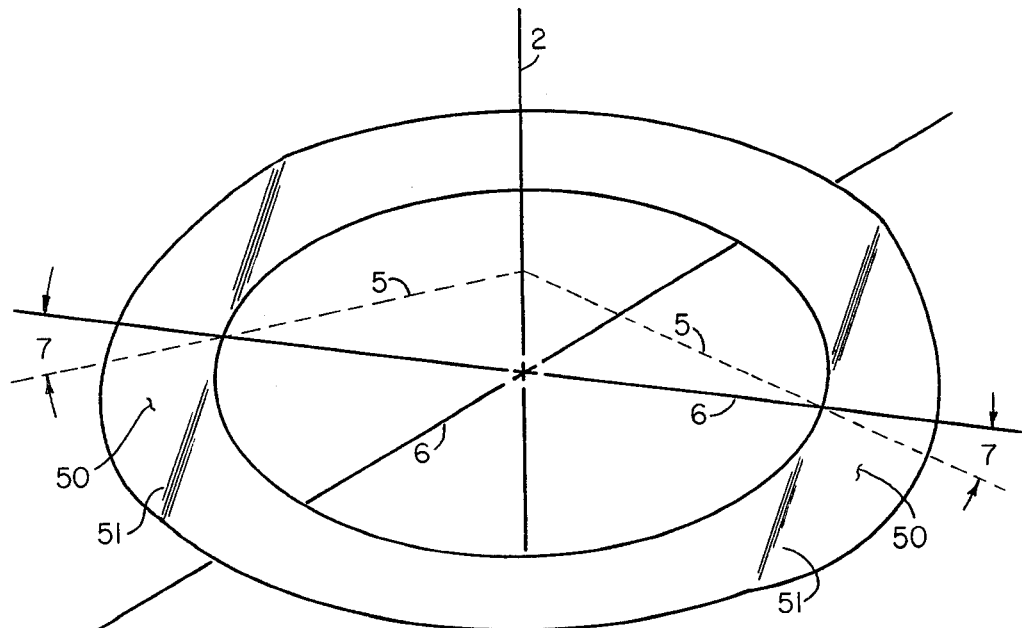
FIG. 5 is an isometric view of an alternative ring configuration in which only portions of the ring have an angled airfoil.
Figure 6:
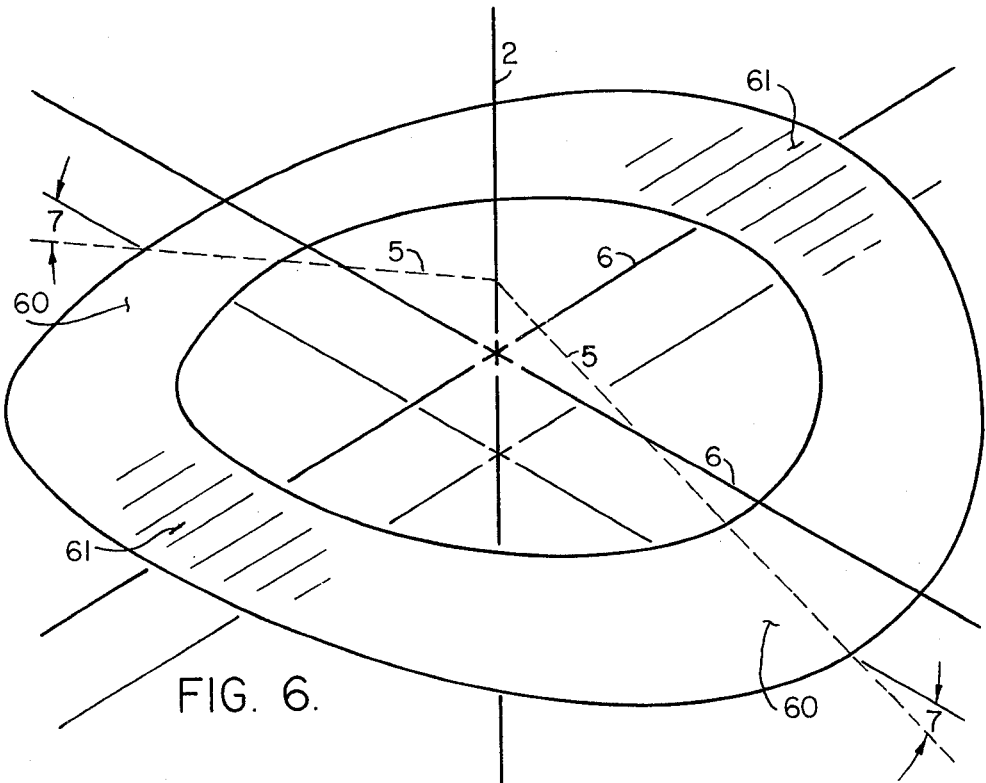
FIG. 6 is an isometric view of another alternative ring configuration in which the desired angle of the airfoil is achieved in two portions of the ring by smoothly bending the ring to a saddle shape.

FIGS. 5 and 6 show two alternate configurations in which the airfoil-angle 7 is not uniform around the entire annulus, but only occurs at certain portions of the annulus. Note that at least a portion of the annulus has a negative airfoil-angle 7 relative to the projected reference plane 6. There are two such portions in each of the samples identified as 50 and 60 in FIGS. 5 and 6, respectively. Note that in these portions 50 and 60 the outer perimeter of the annulus is lower than the inner perimeter of the annulus when the projected reference plane 6 is horizontal and the body is oriented for proper flight, with the upper surface uppermost. FIG. 5 illustrates a configuration which is sharply bent in two places 51 while FIG. 6 illustrates a gradually bent area 61 which forms the plane of the annulus into a saddle shape.

Due to the rotation of the ring there is an averaging effect and the angled portions will still balance downwash effects. However, this balance is being performed by a fraction of the total area, thus greater angle is required. The required angle may be computed as follows:

$$\alpha_p = \alpha \cdot \frac{S_t}{S_p} \quad (5)$$

where
  $\alpha_p$ = angle in the angled portions
  $\alpha$ = airfoil angle determined by equation 3 or 4
  $S_t$ = total airfoil area
  $S_p$ = area of the angled portion of the airfoil In the examples of FIGS. 5 and 6 there are two angled portions of the airfoil. However it is obvious that these same principles are applicable to any number of angled portions.

The saddle shape shown in FIG. 6 can also be applied (slightly) in the field to the conical configuration of FIG. 1 in order to make slight adjustments to the effective airfoil-angle. For example, for a slow game of catch the reduced flight velocity will increase the downwash angle, as described in equations 1 and 2. If desired, the effective airfoil-angle 7 can be easily increased by bending the ring slightly as shown in FIG. 6. A second and opposite example would be in the case of distance competition, where strong throws cause higher flight velocities and thus a reduction of downwash angle. In this case the ring could be bent slightly upwards (opposite of FIG. 6) to reduce the effective airfoil angle for optimum high-speed flight.

The examples of FIGS. 1-4 all illustrate ogival airfoil sections, which have a circular arc top line and a straight bottom line. The present inventor has studied the low-speed aerodynamic characteristics of a number of airfoil sections and found that this section provides minimum drag, and thus maximum length of flight. However, under special circumstances other airfoil sections could be employed (in conjunction with the airfoil-angle 7) to still achieve balanced flight. For example, greater camber might be preferred for slower and shorter flights, while conversely little or no camber (such as a biconvex section) might be preferred for very high speed, long distance flights.

If the airfoil section lacks fore and aft symmetry, the optimum airfoil-angle 7 may be slightly modified. For example, an experiment was conducted on a ring having an airfoil section which had its greatest thickness close to the inside perimeter, rather than midway as is shown in FIGS. 1 through 4. This ring was found to require slightly less airfoil-angle than rings having an ogival airfoil. It is believed that, for a given angle of attack, greater lift is developed when the thicker part of the section is the leading-edge than when it is trailing. This, in itself, partially compensates for downwash effects and lessens the required airfoil-angle for straight flight. However, because this particular airfoil presented its thinnest portion at the outside perimeter it was found to be more easily damaged than the ogival section; thus it is not preferred.

In all cases, however, the airfoil should be quite thin if a long sustained flight is desired. At these relatively low Reynold's numbers, drag is essentially proportional to thickness.

Flanges at the inner perimeter, such as that employed by Bradshaw cause drag. Thus, no flanges are employed at the inner perimeter of the present invention; the vertical distance between the highest and lowest portion at the inner perimeter of the gliding ring in accordance with this invention is less than the maximum thickness of the airfoil.

Figure 4:
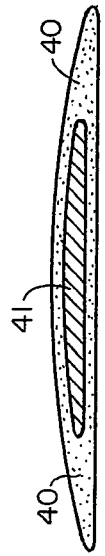
FIG. 4 is a cross-section of another alternative cushioned airfoil.
Figure 3:
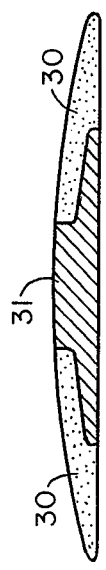
FIG. 3 is a cross-section of a portion of an alternative airfoil which is cushioned for greater safety.

FIGS. 3 and 4 illustrate cushioned airfoils intended for great safety and comfort in catching. In FIG. 3 the airfoil edges 30 are made from a soft material, such as rubber or thermoplastic elastomer. The components may be molded separately and bonded together or the elastomer 30 may be molded directly onto the structural ring 31. In FIG. 4 the elastomer 40 is molded over the structural ring 41. Pins in the mold may be employed to keep the structural ring 41 centered during the process of molding-on the elastomer 40. Alternatively, the structural ring 41 can be made with a number of small raised bosses on the upper and lower surfaces which contact the surface of the elastomermold in order to maintain the position of the structural ring during the elastomer molding process.

It is also possible to mold the entire airfoil from a flexible material, without the added structural ring. However, in this case the material must be considerably more rigid than is required in the versions of FIGS. 3 and 4.

In some cases it is desirable to texture the surface (especially the upper surface) of the airfoil as shown at 11 in FIG. 1. The texture improves grip when throwing and catching. Furthermore, it is believed that texture may enhance lift due to centrifugally-induced airflow caused by the rapid spin during flight.

The flight performance of this invention is truly amazing. For example, a ring of FIG. 1 was constructed having the following dimensions:

| Outside diameter | 11.75" |
| Airfoil chord length | 1.75" |
| Airfoil thickness | 0.135" |
| Weight | 3.4 ounces |
| Airfoil angle | 1.5 degrees |

The ring flies in an exceptionally flat trajectory and straight flight path. The amazing part of its flight is the way it keeps on flying long after everyone has expected it to fall to earth. Many people, including a twelve-year old boy, have been able to throw it farther than 100 yards.

While in the foregoing specification embodiments of the invention have been set forth in considerable detail for purposes of making a complete disclosure thereof, it will be apparent to those skilled in the art that numerous changes may be made in certain details without departing from the spirit and principles of the invention.

What is claimed is:

1. A gliding body comprising;
   an annular airfoil defined by;
      an upper and a lower surface,
      an axis of revolution,
      a projected reference plane which is normal to said axis of revolution,
      an inner and outer perimeter,
      a reference extended chord line,
      passing through said inner and outer perimeters,
   said annular airfoil configured such that at least a portion of said annular airfoil has a negative airfoil-angle relative to said reference plane, so that, at least in said portion, the outer perimeter of the annulus is lower than the inner perimeter of the annulus when said projected reference plane is horizontal and said body is oriented for proper flight, with said upper surface uppermost; thereby compensating for air downwash and balancing the lift fore and aft in said gliding body,
   said annular airfoil having a streamlined cross-section in order to present low aerodynamic drag to a flow of air which is generally parallel to said reference plane,
   said annular airfoil having a weight of less than 0.2 ounces per square inch of projected area, thereby permitting a substantially level glide at speeds below 100 feet per second.

2. A gliding body as recited in claim 1 wherein said annular airfoil is of ogival cross-section.

3. A gliding body as recited in claim 1 wherein at least a portion of said body has a textured surface with surface features having both circumferential and radial discontinuities.

4. A gliding body as recited in claim 1 wherein said annular airfoil is fabricated from a resilient material.

5. A gliding body as recited in claim 4 wherein said resilient material is centrally stiffened by a more rigid material.

6. A gliding body as recited in claim 5 wherein said resilient material is a thermoplastic elastomer and said more rigid material is high-impact thermoplastic.

7. A gliding body as recited in claim 1 wherein said airfoil-angle is computed from the following formula:

$$\alpha_p = \alpha \cdot \frac{S_t}{S_p}$$

where
$\alpha_p$ = degrees of airfoil angle in those portions of the airfoil which are angled
$S_t$ = total airfoil area
$S_p$ = area of the angled portions of the airfoil
$\alpha = (K \cdot W/D^2)$
where:
K = 45 ± 15
W = weight of said gliding body in ounces
D = mean diameter of annulus in inches.

8. A gliding body comprising;
   an annular airfoil defined by;
      an upper and a lower surface,
      an axis of revolution,
      a projected reference plane which is normal to said axis of revolution, an inner and outer perimeter,
      a reference chord line passing through said inner and outer perimeters,
   said annular airfoil configured with a negative airfoil-angle such that the revolution of the chord length of said reference chord line defines the angled surface of a frustrum of a cone, whereby in flight the forward portion of said annular airfoil is at a lower angle of incidence to the flight path than the remainder of said annular airfoil, thereby compensating for air downwash effects from said forward portion and balancing the aerodynamic lift fore and aft in said gliding body,
   said annular airfoil having a streamlined cross-section in order to present low aerodynamic drag to a flow of air which is generally parallel to said reference plane,
   said annular airfoil having a weight of less than 0.2 ounces per square inch of projected area, thereby permitting a substantially level glide at speeds below 100 feet per second.

9. A gliding body as recited in claim 8 wherein said airfoil-angle is determined by the following formula:

$$\alpha = \frac{KW}{D^2}$$

where
- $\alpha$ = airfoil-angle, degrees
- $K = 45 \pm 15$
- $W$ = weight of said gliding body, ounces
- $D$ = means diameter of annulus, inches.

10. A gliding body as recited in claim 8 wherein said airfoil angle is between 1 and 2 degrees.

11. A gliding body as recited in claim 8 and having the following dimensions:
- Weight = 2 to 4 ounces
- Mean diameter = 8 to 12 inches
- Chord length = 1 to 3 inches
- Thickness = 0.05 to 0.20 inches
- Airfoil angle = 1 to 2 degrees.

12. A gliding body as recited in claim 11 having an ogival airfoil section.

13. A gliding body as recited in claim 12 wherein said body is constructed of high impact thermoplastic material.

14. A gliding body as recited in claim 12 wherein said body is constructed of a composite of thermoplastic elastomer material and high-impact thermoplastic material.

15. A gliding body as recited in claim 8 wherein said airfoil angle is determined by the following formula:

$$\alpha = 64,000 \frac{W}{V^2 \cdot D^2}$$

where
- $\alpha$ = airfoil angle, degrees
- $W$ = weight of said gliding body, ounces
- $V$ = intended flight velocity, feet per second
- $D$ = mean diameter of annulus, inches.

16. A gliding body comprising;
an annular airfoil defined by;
  an upper and a lower surface,
  an axis of revolution,
  a projected reference plane which is normal to said axis of revolution, an inner and outer perimeter,
  a reference extended chord line, passing through said inner and outer perimeters,
said annular airfoil configured such that at least a portion of said annular airfoil has a negative airfoil-angle relative to said reference plane, so that, at least in said portion, the outer perimeter of the annulus is lower than the inner perimeter of the annulus when said projected reference plane is horizontal and said body is oriented for proper flight, with said upper surface uppermost; thereby compensating for air downwash and balancing the lift fore and aft in said gliding body,
said annular airfoil having a streamlined cross-section in which the vertical distance between the highest and lowest portions at the inner perimeter is less than the maximum thickness of the airfoil,
said annular airfoil having a weight of less than 0.2 ounces per square inch of projected area, thereby permitting a substantially level glide at speeds below 100 feet per second.

17. A gliding body as recited in claim 16 wherein said annular airfoil is of ogival cross-section.

18. A gliding body as recited in claim 16 wherein at least a portion of said body has a textured surface with surface features having both circumferential and radial discontinuities.

19. A gliding body as recited in claim 16 wherein said annular airfoil is fabricated from a resilient material.

20. A gliding body as recited in claim 19 wherein said resilient material is centrally stiffened by a more rigid material.

21. A gliding body as recited in claim 20 wherein said resilient material is a thermoplastic elastomer and said more rigid material is high-impact thermoplastic.

22. A gliding body as recited in claim 16 wherein said airfoil-angle is computed from the following formula:

$$\alpha_p = \alpha \cdot \frac{S_t}{S_p}$$

where
- $\alpha_p$ = degrees of airfoil angle in those portions of the airfoil which are angled
- $S_t$ = total airfoil area
- $S_p$ = area of the angled portions of the airfoil
- $\alpha = (K \cdot W / D^2)$ where:
- $K = 45 \pm 15$
- $W$ = weight of said gliding body in ounces
- $D$ = mean diameter of annulus in inches.

23. A gliding ring comprising an annular airfoil having an ogival cross-section in any radial plane containing the rotational axis of the airfoil and with the outside of the lower surface lower than the inside thereof, said lower surface inclined at an angle of between 1 and 2 degrees to a plane perpendicular to the rotational axis of the airfoil.

* * * * *